US012458967B2

(12) United States Patent
Jans et al.

(10) Patent No.: US 12,458,967 B2
(45) Date of Patent: Nov. 4, 2025

(54) METHOD OF STORING DATA IN POLYMER

(71) Applicant: IMEC vzw, Leuven (BE)

(72) Inventors: Karolien Jans, Tessenderlo (BE); Tim Stakenborg, Heverlee (BE); Frank Holsteyns, Leuven (BE)

(73) Assignee: IMEC VZW, Leuven (BE)

( * ) Notice: Subject to any disclaimer, the term of this patent is extended or adjusted under 35 U.S.C. 154(b) by 1644 days.

(21) Appl. No.: 16/363,926

(22) Filed: Mar. 25, 2019

(65) Prior Publication Data

US 2019/0291106 A1    Sep. 26, 2019

(30) Foreign Application Priority Data

Mar. 26, 2018 (EP) .................................... 18163991

(51) Int. Cl.
| | | |
|---|---|---|
| *B01L 3/00* | (2006.01) | |
| *B82Y 10/00* | (2011.01) | |
| *C08G 73/06* | (2006.01) | |
| *G11B 7/245* | (2006.01) | |
| *G11C 13/00* | (2006.01) | |

(52) U.S. Cl.
CPC ... *B01L 3/502715* (2013.01); *B01L 3/502753* (2013.01); *G11B 7/245* (2013.01); *G11C 13/0016* (2013.01); *G11C 13/0019* (2013.01); *B82Y 10/00* (2013.01); *C08G 73/0605* (2013.01)

(58) Field of Classification Search
CPC ......... B01L 3/502715; B01L 3/502753; G11B 7/245; G11C 13/0016; G11C 13/0019; B82Y 10/00; C08G 73/0605
See application file for complete search history.

(56) References Cited

U.S. PATENT DOCUMENTS

| | | |
|---|---|---|
| 11,276,003 B2 | 3/2022 | Stakenborg et al. |
| 11,276,481 B2 | 3/2022 | Stakenborg et al. |
| 2017/0017436 A1* | 1/2017 | Church ............... G11C 13/0016 |

FOREIGN PATENT DOCUMENTS

| | | |
|---|---|---|
| WO | WO 2013/178801 A2 | 12/2013 |
| WO | WO 2015/090879 A1 | 6/2015 |
| WO | WO 2016/205156 A1 | 12/2016 |
| WO | WO 2017/011492 A1 | 1/2017 |
| WO | WO 2017/151680 A3 | 9/2017 |

OTHER PUBLICATIONS

Tessmer et al. "Investigating bioconjugation by atomic force microscopy." Journal of Nanobiotechnology, vol. 11:25, pp. 1-17. (Year: 2013).*
Martens et al. "Click and Click-Inspired Chemistry for the Design of Sequence-Controlled Polymers." In: Sequence-Controlled Polymers, First Edition, Jean-Francois Lutz (Ed.), First published: Dec. 4, 2017; Chapter 13, pp. 379-416. (Year: 2017).*
Patabadige et al. "Micro Total Analysis Systems: Fundamental Advances and Applications." Analytical Chemistry, vol. 88, pp. 320-338. (Year: 2016).*
Lombardi et al. "Advances in microfluidics for drug discovery." Expert Opinion on Drug Discovery, vol. 5:11, pp. 1081-1094. (Year: 2010).*
Niedringhaus et al. "Landscape of Next-Generation Sequencing Technologies." Analytical Chemistry, vol. 83, pp. 4327-4341. (Year: 2011).*
Alabi et al. "Iterative Synthetic Methods for the Assembly of Sequence-Controlled Non-Natural Polymers." In: Sequence-Controlled Polymers, First Edition, Jean-Francois Lutz (Ed.), First published: Dec. 4, 2017; Chapter 6, pp. 159-181. (Year: 2017).*
Gangloff et al. "Polymerization via the Ugi-Reaction using Aromatic Monomers." Journal of Polymer Science, Part A: Polymer Chemistry, vol. 53, pp. 1680-1686. (Year: 2015).*
Collins et al. "The emergence of oxime click chemistry and its utility in polymer science." Polymer Chemistry, vol. 7, pp. 3812-3826. (Year: 2016).*
Arslan et al. "Clickable Poly(ethylene glycol)-Based Copolymers Using Azide-Alkyne Click Cycloaddition-Mediated Step-Growth Polymerization." Macromolecular Chemistry and Physics, vol. 215, pp. 2237-2247. (Year: 2014).*
Kore et al. "Click Chemistry Based Functionalizations of Nucleoside, Nucleotide and Nucleic Acids." Current Organic Chemistry, vol. 17, pp. 2164-2191. (Year: 2013).*
Trinh et al. "Synthesis of Molecularly Encoded Oligomers Using a Chemoselective "AB + CD" Iterative Approach." Macromolecular Rapid Communications, vol. 35, pp. 141-145. (Year: 2014).*

(Continued)

*Primary Examiner* — Kaitlyn L Minchella
*Assistant Examiner* — Steven W. Bailey
(74) *Attorney, Agent, or Firm* — Knobbe Martens Olson & Bear LLP

(57) ABSTRACT

The disclosed technology generally relates to storing data, and more particularly relates to a method of storing data in a polymer, where the data comprises a sequence of bits. In one aspect, the method comprises receiving a sequence of bits to be stored and providing a group of different homo-bifunctional monomers. Each homo-bifunctional monomer comprises a core structure having identical functional groups attached at two different positions of the core structure. The group of different homo-bifunctional monomers comprises homo-bifunctional monomers having at least two different core structures. The method further comprises linking the different homo-bifunctional monomers together to form the polymer having a sequence of monomer core structures representing the sequence of bits to be stored. The different homo-bifunctional monomers are linked together using a click chemistry reaction between the functional groups of the different homo-bifunctional monomers. The present disclosure further relates to a synthesis system for performing the method.

17 Claims, 7 Drawing Sheets

(56) References Cited

OTHER PUBLICATIONS

Organik et al. "Scaling up DNA data storage and random access retrieval." bioRxiv, doi: https://doi.org/10.1101/114553, pp. 1-14. (Year: 2017).*

Rodrigues et al. "Accessing New Chemical Entities through Microfluidic Systems." Angewandte Chemie International Edition, vol. 53, pp. 5750-5758. (Year: 2014).*

Lutz et al., "Sequence-Controlled Polymers," Science, vol. 341, dated Aug. 9, 2013.

European Search Report in Application No. 18163991, priority counterpart, dated Sep. 17, 2018 in 5 pages.

* cited by examiner

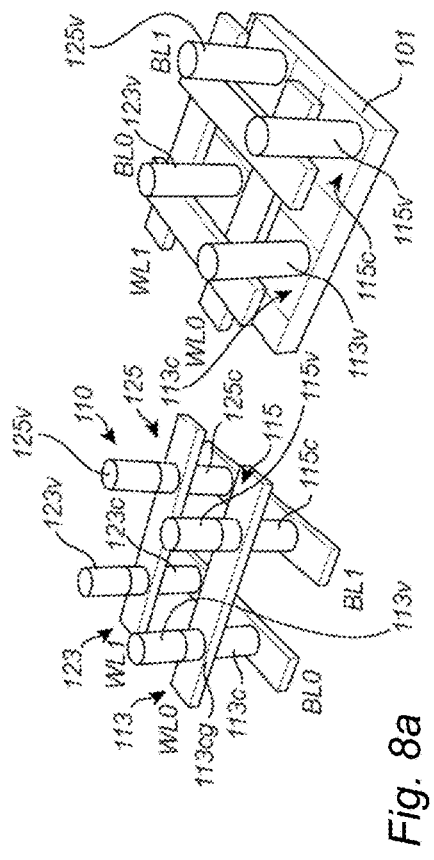
Fig. 8a
Fig. 8b
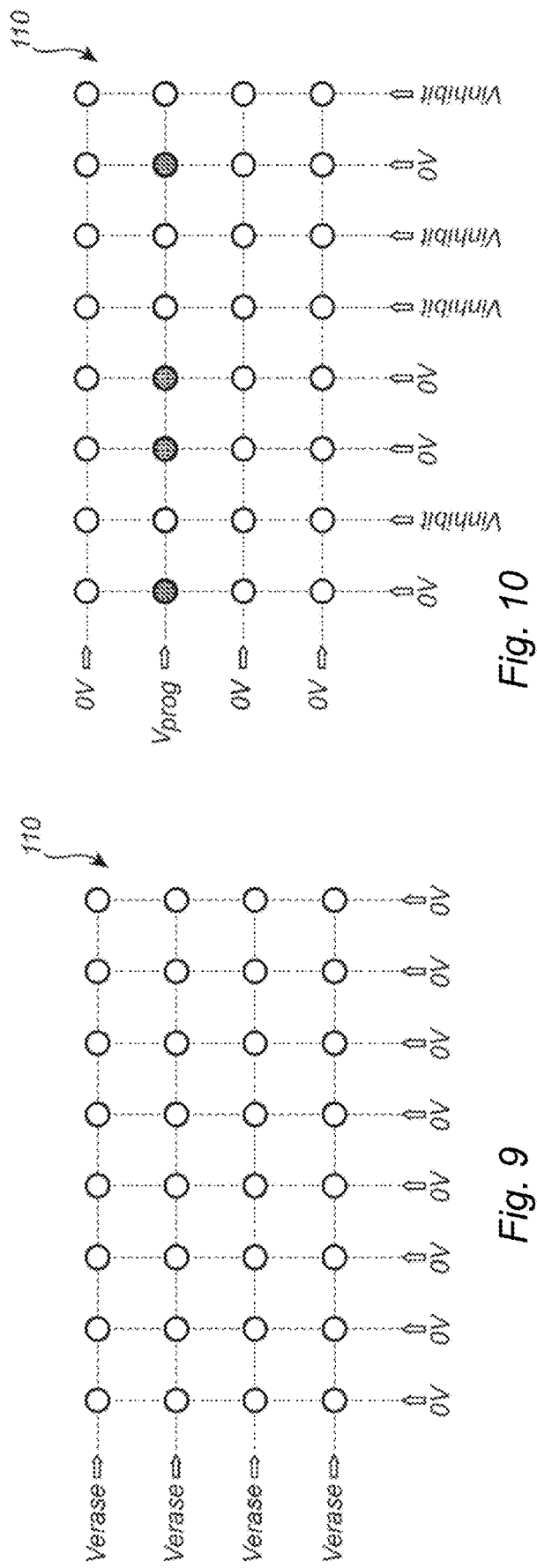
Fig. 9
Fig. 10

METHOD OF STORING DATA IN POLYMER

CROSS-REFERENCE TO RELATED APPLICATIONS

This application claims foreign priority to European Patent Application No. 18163991.5, filed Mar. 26, 2018, the content which is incorporated by reference herein in its entirety.

BACKGROUND

Field

The disclosed technology generally relates to storing data, and more particularly relates to a method of storing data in a polymer.

Description of the Related Technology

There exists a growing need for technology solutions associated with storing very large amounts of data being generated each year, for example in the form of graphics and text. The vast amounts of data being generated may in the future exceed capacities of present storage equipment including hard drives, disks and tapes.

Deoxyribonucleic acid (DNA) has been proposed for storage of data, and it has been suggested that, in theory, it may be possible to store 215 petabytes in a single gram of DNA. DNA may also have many advantages for storing digital data over existing technologies. For example, DNA is ultra compact, and may last hundreds of thousands of years or longer if kept in a cool and/or dry place. Although very promising, DNA writing is still very complex and costly and, compared with other forms of data storage, writing and reading to DNA is relatively slow.

Hence, there is a need in the art for improved disruptive data storage.

SUMMARY OF CERTAIN INVENTIVE ASPECTS

It is an object of the invention to at least partly overcome one or more limitations of the prior art. In particular, it is an object to provide an alternative method of storing data.

According to a first aspect, there is provided a method of storing data in a polymer; wherein the data comprises a sequence of bits and the method comprises the steps of: receiving a sequence of bits to be stored; providing a group of different homo-bifunctional monomers; wherein each homo-bifunctional monomer comprises a core structure having identical functional groups attached at two different positions of the core structure; and wherein the group of different homo-bifunctional monomers comprises homo-bifunctional monomers having at least two different core structures; and linking the different homo-bifunctional monomers together to form the polymer so that the sequence of monomer core structures represents the sequence of bits to be stored; and wherein the different homo-bifunctional monomers are linked together using a click chemistry reaction between the functional groups of the different homo-bifunctional monomers.

The data may be of any size and may be provided in the form of sub-sequences of data, each sub-sequence comprising a sequence of bits that is stored. The data and different sequences of bits to be stored may be received continuously or batch-wise.

The sequence of bits may be received in binary format, using two symbols (0 and 1). However, the sequence of bits may also be received in other number systems, such as in a quaternary format, e.g., a base-4 numeral system using digits 0, 1, 2 and 3 to represent the information.

The receiving of the sequence of bits enables writing of the received sequence into a polymer.

A polymer may be a linear polymer, e.g., be a polymer in which the monomeric units are linked together to form a long and more or less straight chain. The linear polymer may however have a secondary structure and be folded.

In embodiments, the polymer is not a branched polymer.

The polymer is synthesized using homo-bifunctional monomers. A single homo-bifunctional monomer has a core structure and two identical functional groups attached to the core structure. The identical functional groups are both attached to the core structure but to different positions of the core structure. The core structure may be any type of chemical group, and the group of different homo-bifunctional monomers comprises monomers having different core structures so that the different values of the binary digits or sequence of binary digits may be represented by different core structures. The homo-bifunctional monomers are thus linked together to form a polymer in a sequence so that the synthesized polymer represents the sequence of bits. In other words, the homo-bifunctional monomers have different core structures to allow storing of binary information in a polymer comprising the homo-bifunctional polymers. The sequence of monomer core structures represents the sequence of bits in the sequence of bits to be stored.

The homo-bifunctional monomers are linked together using click chemistry reactions between the functional groups of the monomers. Thus, the functional groups are selected so that the monomers can be linked together using a click chemistry reaction.

A click chemistry reaction is not a single specific of reaction but instead a class of small molecule reactions known to the person skilled in chemical synthesis. The click chemistry reactions were introduced by Sharples and co-workers in 2001. A click chemistry reaction may be modular, wide in scope, give high yields, create only inoffensive by-products that can be removed by nonchromatographic methods and or be stereospecific but not necessarily enantio-selective.

The click chemistry reaction may be an orthogonal click chemistry reaction.

The first aspect is based on the inventor's insight that the use homo-bifunctional monomers with a different core structure and "click chemistries" to obtain polymer synthesis is much faster and provides a better alternative than the solid phase DNA synthesis schemes that has previously been used for storing binary information, e.g. on chip.

For de novo DNA synthesis, phosphoramidite DNA synthesis chemistry is typically used. This method, however, remains slow and expensive. To increase the density of synthesizing different DNA molecules different microarray techniques have been used. Such DNA arrays can be used to store data, but are viable for different reasons. The first aspect however makes it possible to use other polymers than DNA to store data in a fast and efficient way.

The inventors have thus found that the use of click chemistry to create unnatural DNA constructs will result in a much faster synthesis compared to the conventional 4 steps DNA synthesis reaction scheme as already shown before.

To summarize, in addition to DNA for on chip data storage applications, click chemistries of homo-bifunctional monomers offers an even more unique opportunity to create novel linear polymer constructs in a fast and efficient way. Writing data on a polymer as described by the method, allows for large data sequences to be stored in a fast way at least in part due to the large size a polymer can take and the fast click chemistry reactions.

In embodiments of the first aspect, the method is further comprising assigning at least one core structure of the different homo-bifunctional monomers to represent a first digit and at least one different core structure of the different homo-bifunctional monomers to represent a second digit in the sequence of bits to be stored.

The step of assigning may be performed before linking the homo-bifunctional monomers together.

As an example, the method may comprise assigning a first digit or a first sub-sequence of digits in the sequence of bits to be represented by at least one core structure of the different homo-bifunctional monomers and assigning a second digit or a second sub-sequence of digits in the sequence of bits to be represented by at least one different core structure of the different homo-bifunctional monomers.

As an example, the method may comprise assigning at least one core structure of the different homo-bifunctional monomers to represent 0 and at least one different core structure of the different homo-bifunctional monomers to represent 1 in the sequence of bits to be stored.

Thus, each bit in the sequence of bits to be stored may be represented by at least one specific core structure. However, a bit may be represented by a first group of different core structures and another type of bit may be represented by a second group of different core structures that are other than the core structures in the first group.

In other words, a 0 in a binary bit sequence may be represented by any core structure in a first group whereas a 1 in a binary bit sequence may be represented by any core structure in a second group, wherein none of the core structures present in the first group is present in the second group.

Furthermore, the method may comprise assigning bits to core structures such that a single core structure represents a sub-sequence of bits that is at least two digits in the sequence of bits.

However, since there are a lot of core structures may be present in homo-bifunctional monomers, a first type of core structure or a first group of core structures may represent a first sequence of bits, whereas a second type of core structure or a second group of core structures may represent a second sequence of bits and so on, wherein the first sequence of bits is different than the second sequence of bits. For example, the method may comprise assigning at least one core structure of the different homo-bifunctional monomers to represent a first sequence of bits and at least one different core structure of the different homo-bifunctional monomers to represent a second sequence of bits in the sequence of bits to be stored.

The method may thus further comprise translating the sequence of bits to a calculated sequence of core structures based on the above assignment of bits to core structures, and the n linking the homo-bifunctional monomers together according to the calculated sequence of core structures.

Thus, the sequence 00 may be represented by a first core structure or first group of core structures, the sequence 01 may be represented by a second core structure or second group of core structures, the sequence 10 may be represented by a third core structure or third group of core structures and the sequence 11 may be represented by a fourth core structure or fourth group of core structures.

Assigning sequences of bits to core structures such that a single core structure represents at least two digits in the sequence of bits is beneficial in that the formed polymer becomes more compact. Thus, the formed polymer may comprise a number of core structures that is less than the number of bits in the data to be stored. As an example, the bit to core structure ratio; e.g., the number of bits in the data in relation to the number of core structures in the formed polymer, may be at least 2:1, such as at least 3:1; such as at least 4:1; such as at least 8:1.

In embodiments of the first aspect, the method is further comprising determining a sequence of homo-bifunctional monomers representing the sequence of bits based on the assigning of bits to core structures.

In embodiments of the first aspect, the step of linking the different homo-bifunctional monomers together comprises the supplying the different homo-bifunctional monomers in a sequence representative of the sequence of bits to a site of reaction.

The site of reaction may for example be a chamber, such as a synthesis chamber, a chip surface or an electrode surface onto which the polymer chain grows as monomers are coupled to the polymer. The different homo-bifunctional monomers may be supplied from individual reservoirs to the reaction site.

Thus, the method may comprise assigning bits to core structures, translating the sequence of bits to be stored to obtain a calculated sequence of core structures and then supplying the homo-bifunctional monomers to the site of reaction according to the calculated sequence of core structures.

Moreover, the group of homo-bifunctional monomers may comprise monomers having the same core structure but different functional groups to allow writing of several bits in sequence having the same value. Thus, if for example a core structure denoted A represents the bit 1, the group of monomers may comprise monomers having the same core structure A but different functional groups so that these can be synthesized together using click chemistry reaction to store a bit sequence having several digits of the same value in a row, such as 111 etc. Consequently, in embodiments, a first digit or a first sub-sequence of digits in the sequence to be stored is represented by a first core structure A and wherein a second digit or a second sub-sequence of digits in the sequence to be stored is represented by a second core structure B, and wherein the group of different homo-bifunctional monomers comprises four different homo-bifunctional monomers that are represented by the formulas i) X-A-X
ii) Y-A-Y
iii) X-B-X; and
iv) Y-B-Y wherein A and B are different cores structures and Y and X are two different functional groups with the capacity to link different monomers in a click chemistry reaction between the functional group X and the functional group Y.

It is to be understood that the group of homo-bifunctional monomers may comprise further homo-bifunctional monomers than i) to iv); such as v) X-C-X
vi) Y-C-Y
vii) X-D-X; and
viii) Y-D-Y, etc.

Furthermore, the click chemistry reaction may be performed using simple reaction conditions, such as be a reaction that is insensitive to oxygen and water. The click chemistry reaction may be performed with the use of no solvent, using a solvent that is benign, such as water, or using a solvent that is easily removed.

However, the group of homo-bifunctional monomers may also comprise monomers that do not represent a digit but instead act as spacers or linkers between homo-bifunctional monomers having core structures that represents digits or sequences of digits. In this way, the core structures that represent digits may be functionalized with the same functional groups, and these may be linked together using such spacers or linkers having functional groups that react in a click chemistry reaction with the functional groups of the core structures that represent digits.

Consequently, in embodiments, a first digit or a first sub-sequence of digits in the sequence to be stored is represented by a first core structure A and wherein a second digit or a second sub-sequence of digits in the sequence to be stored is represented by a second core structure B, and wherein the group of different homo-bifunctional monomers comprises three different homo-bifunctional monomers that are represented by the formulas i) X-A-X;
iii) X-B-X; and
ix) Y-Z-Y wherein A, B and Z are different cores structures, Y and X are two different functional groups with the capacity to link the different monomers in a click chemistry reaction between the functional group X and the functional group Y, and Z is a spacer monomer that does not represent any digit in the bit sequence.

The click chemistry reaction may for example have a high thermodynamic driving force, such as a high thermodynamic driving that is more than 20 kcal mol$^{-1}$. Such a reaction will provide for synthesizing the polymer at high rate, e.g., storing the bit sequence at a high rate.

In embodiments of the first aspect, the click chemistry reaction is a reaction selected from the group consisting of nucleophilic ring opening reactions of epoxides and aziridines, non-aldol type carbonyl reactions, such as formation of hydrazones and heterocycles, additions to carbon-carbon multiple bonds, such as oxidative formation of epoxides and Michael Additions, and cycloaddition reactions.

As an example, the click chemistry reaction may be a thiol-ene reaction, a Diels-Alder reaction, an imine condensation, a hydrazone condensation, an oxime carbonyl condensation or a copper catalyzed azide-alkyne cycloaddition (CuAAC).

These reactions are all known and typical click chemistry reactions.

A thiol-ene reaction, also known as alkene hydrothiolation, is an organic reaction between a thiol and an alkene to form an alkyl sulfide. Thus, in embodiments, the group of homo-bifunctional monomers comprises monomers having a first core structure and thiols as functional groups and monomers having a second core structure and alkenes as functional groups. Thus, in the examples above, in which the group of monomers comprises different homo-bifunctional monomers that are represented by the formulas i) to ix), X may be a thiol and Y may be an alkene.

The Diels-Alder reaction is an organic chemical reaction between a conjugated diene and a substituted alkene, commonly termed the dienophile, to form a substituted cyclohexene derivative. Thus, in embodiments, the group of homo-bifunctional monomers comprises monomers having a first core structure and conjugated dienes as functional groups and monomers having a second core structure and substituted alkenes as functional groups. Thus, in the example above, in which the group of monomers comprises different homo-bifunctional monomers that are represented by the formulas i) to iv), X may be a conjugated diene and Y may be a substituted alkene.

In embodiments of the first aspect, the click chemistry reaction is a copper catalyzed azide-alkyne cycloaddition (CuAAC) and the formed polymer comprises a triazole backbone linker between the core structures of the monomers.

Consequently, in the example above, in which the group of monomers comprises different homo-bifunctional monomers that are represented by the formulas i) to ix), X may be an alkyne moiety and Y may be an azide moiety.

In embodiments, the click chemistry ligation reaction is between a first homo-bifunctional monomer having a terminal alkyne moiety and second homo-bifunctional monomer having an azide moiety for forming a product having a triazole moiety.

The CuACC reaction is a known reaction and has a rate acceleration that is much higher compared to the uncatalyzed 1,3-dipolar cycloaddition. It is useful over a broad temperature range, may be insensitive to aqueous conditions and a pH range over 4 to 12. The products may be isolated by simple filtration or extraction without the need for chromatography or recrystallization. The active Cu(I) catalyst can be generated from Cu(I) salts or Cu(II) salts using sodium ascorbate as the reducing agent.

However, the reaction between the first homo-bifunctional monomer having a terminal alkyne moiety and second homo-bifunctional monomer having an azide moiety for forming a product having a triazole moiety do not exclusively need to be catalyzed by copper. As an example, such a reaction may be catalyzed by an addition of a catalytic amount of a metal salt having a metal ion selected from the group consisting of Au, Ag, Hg, Cd, Zr, Ru, Fe, Co, Pt, Pd, Ni, Rh, and W.

In embodiments, the click chemistry reaction is a click chemistry reaction that may be electrically induced. For example, the click chemistry reaction may be a reaction that may be electrically induced by an electrode.

The polymer constructs synthesis by the method described above can as discussed function as bits for data storage. The polymer constructs can later be released for reading back the data. Hereto, the linear polymer constructs with a different core (A, B, C, D) can be selected to simplify read-out. For instance, the core structures may comprise different fluorophores to have a strand of different colors. Alternatively, it can be different groups with a different charge or magnitude that could be read using e.g. nanopore sequencing.

Consequently, in embodiments of the first aspect different homo-bifunctional monomers differ by having core structures comprising groups with a different charge.

As a further example, the different homo-bifunctional monomers may differ by having core structures comprising groups of different sterical size. Thus, different monomers in the group of monomers may have bulky or sterically differentiating groups within the core structures. The bulky or sterically differentiating groups may for example be selected from poly-ethylene glycol units of different length, having a benzene ring and lacking a benzene ring etc. Furthermore, the different homo-bifunctional monomers may differ by having core structures comprising fluorophores of different colors.

The core structures may also differ between monomers in that they have different functional groups except the functional groups participating in the click chemistry reaction. As an example, different functional groups may be selected from the group consisting of biotin, azide-, carboxy-, thiol- and epoxy-moieties. However, selecting the type of core structure depends on the type of click chemistry used for linking the monomers together. For example, if the copper catalysed azide-alkyne reaction is used for the click chemistry, an azide moiety in the core structure may be avoided since this may lead to branching of the formed polymer.

In embodiments, the different homo-bifunctional monomers do not comprise any sugars, such as five-carbon sugars or six-carbon sugars.

However, the homo-bifunctional monomers may comprise the traditional bases and a five-carbon sugar found in the nucleotides forming DNA. Consequently, in embodiments of the first aspect, the different homo-bifunctional monomers are different nucleosides functionalized with the functional groups.

A nucleotide, comprising one-, two- or three-phosphates attached to the nucleoside, may thus be functionalised with functional groups suitable for a click chemistry reaction to form a functionalised nucleoside suitable for the method. As an example, the nucleoside may comprise a five-carbon sugar molecule with a nitrogenous base functionalized with functional groups suitable for a click chemistry reaction, such as functionalized with an alkyne moiety or an azide moiety. The core structure in such a homo-bifunctional monomer is thus the five-carbon sugar molecule with the nitrogenous base, and the monomers in the group of homo-bifunctional monomers may differ in comprising different bases, such as adenine, cytosine, guanine, thymine and uracil. Thus, the method of the first aspect may be applied in de novo DNA synthesis with the difference that functionalized nucleosides are linked together using a click chemistry reaction.

In embodiments of the first aspect, the step of linking the different homo-bifunctional monomers together to form the polymer is performed at a solid support so that the formed polymer is attached to the solid support.

The solid support may for example be the surface of a chip, and the formed polymer may be attached to the surface. Thus, the formed polymer may be covalently attached to the solid support at one end. This may allow for growing of the polymer in one direction only, e.g., in the "free" end only.

In embodiments of the first aspect, the method further comprises reading back the sequence of bits that was stored.

This may for example be performed by releasing the monomers of the formed polymer to read back the sequence of bits that was stored.

As an example, reading back the sequence of bits that was stored may be performed by differentiating between different core structures in a nanopore.

The nanopore may thus comprise at least one pore of nanometer size. A nanopore may be formed in silicon or graphene.

Consequently, the method may comprise providing a structure comprising at least one nanopore and then reading back the sequence of bits that was stored by differentiating between different core structures in the nanopore A nanopore may thus function as a single-molecule detector. When present in an electrically insulating membrane, the detection principle may be based on monitoring the ionic current passing through the nanopore as a voltage is applied across the membrane. When the nanopore is of molecular dimensions, passage of the different monomers having different core structures, e.g. in terms of charge and/or structure, may cause a different electrical output, which can be related back to the type of monomer. As an example, a monomer having a benzene structure in the core structure may give a different read-out than a core structure having an alkene group in the core structure. Thus, a nanopore may differentiate between the different monomers due to their different size or charge, and the sequence of monomers may thus be established during read-out.

As a second aspect, there is provided a synthesis system comprising a microfluidic chip and a control unit, wherein the microfluidic chip comprises a polymer synthesis chamber configured to comprise a polymer in liquid or a polymer attached to an inner surface of the chamber, microfluidic channels fluidically connected to the polymer synthesis chamber and configured to forward liquids to the polymer synthesis chamber, at least four different compartments, each fluidically connected to the polymer synthesis chamber via one of the microfluidic channels, and each configured to comprise a solution of homo-bifunctional monomers, and wherein the control unit is configured to receive information on the type of homo-bifunctional monomers in each compartment: receive a sequence of bits; determine a sequence of homo-bifunctional monomers representing the sequence of bits; forward solutions from the at least four different compartments in a sequence corresponding to the determined sequence of homo-bifunctional monomers to the polymer synthesis chamber, thereby initiating synthesis of a polymer in the polymer synthesis chamber having a sequence of monomers representing the sequence of bits.

The synthesis system is thus suitable for performing the method of the first aspect. The synthesis system may be a microfluidic system.

The polymer may be grown in solution in the polymer synthesis chamber or it may be grown when attached to a surface in the polymer synthesis chamber. The inner surface of the chamber may thus be functionalized in order to allow for a polymer to be synthesized onto the surface. The inner surface of the chamber may thus be grafted with a starting polymer sequence onto which the polymer made of homo-bifunctional monomers is grown. This allows for growing the polymer in one end only. The control unit is configured to receive the data to be stored, translating this sequence into a sequence of core structures in a polypeptide and thus the sequence in which the different homo-bifunctional monomers is to be forwarded to the polymer synthesis chamber in order to synthesize the desired polymer.

The second aspect may generally present the same or corresponding advantages as the former aspect.

In embodiments of the second aspect, the polymer synthesis chamber is arranged to be in contact with a photon source for photoelectrically inducing a chemical reaction in the polymer synthesis chamber.

The photon source may be an illumination source configured to illuminate the polymer synthesis chamber with light so that the supplied photons can drive a reduction-oxidation reaction for synthesizing the homo-bifunctional monomers in the polymer synthesis chamber.

In embodiments of the second aspect, the polymer synthesis chamber is arranged to be in contact with an electrode for electrically inducing a chemical reaction in the polymer synthesis chamber.

This is advantageous in that it allows for controlling the synthesis reaction in the synthesis chamber simply by means of the electrode. The electrode may thus be used for activating a catalyst that catalyses the click chemistry reaction between the homo-bifunctional monomers in the polymer synthesis chamber. The click chemistry reaction in the polymer synthesis chamber may thus be an electro-induced reaction.

The catalyst may thus be a redox-active catalyst.

As an example, the click chemistry reaction in the polymer synthesis chamber may be a copper catalyzed azide-alkyne cycloaddition (CuAAC) and the electrode may be used for locally transferring the copper catalyst between Cu(I) and Cu(II), e.g., between an active Cu(I) state to an inactive Cu(II) state.

As a further example, Lewis-acid catalysts may be used for an electro-induced click chemistry reaction. One example is a Lewis acid-catalyzed Diels-Alder reaction.

The polymer synthesis chamber may be in contact with more than one electrode and the synthesis may be performed site specific by addressing the electrodes using an active circuitry. This may enable a smaller footprint and different polymers can be built up in the same chamber, e.g., the overall synthesis may become faster.

As an alternative to a single electrode for electrically inducing a chemical reaction in the polymer synthesis chamber, an array of electrodes may be used. These may be in contact with the polymer synthesis chamber or be arranged within the chamber, such as forming one of the inner side walls of the chamber. The chamber may thus comprise an array of synthesis locations, each corresponding to an electrode of the electrode array.

The array of electrodes may be arranged as or in a molecular synthesis device.

Thus, according to an alternative aspect, there is provided a molecular synthesis device comprising: a synthesis array comprising an array of synthesis locations and an electrode arranged at each synthesis location, and a non-volatile memory comprising an array of bit cells, a set of wordlines and a set of bitlines, wherein each bit cell comprises a non-volatile memory transistor having a control gate connected to a wordline, a first source/drain terminal, and a second source/drain terminal connected to a bitline, wherein the electrode at each synthesis location of the synthesis array is connected to the first source/drain terminal of a respective one of the bit cells of the non-volatile memory.

The synthesis array may be in fluid contact with compartments for storing homo-bifunctional polymers. As an example, the molecular synthesis device may be arranged in the synthesis system of the second aspect, such as arranged so that the synthesis array is present in polymer synthesis chamber or in fluid contact with the polymer synthesis chamber. The synthesis system may further comprise a plurality of synthesis chambers, and each such chamber may be in contact with an individual electrode of the synthesis array.

The alternative aspect is based on the insight that connecting an electrode of each synthesis location of a synthesis array with a bit cell of a non-volatile memory enables individual control of the electrodes while obviating the need for a dedicated and individually controllable line to each electrode.

More specifically, the molecular synthesis device enables a pattern corresponding to a selection of synthesis locations of the synthesis array in which a chemical synthesis reaction is to be enabled to be programmed/stored in the array of bit cells of the non-volatile memory. The electrodes of the synthesis array may thereafter be activated/enabled (e.g., driven or biased) in accordance with the stored pattern using a technique resembling read-out of the non-volatile memory.

Owing to the design of the bit cells of the non-volatile memory, voltages may be supplied simultaneously to the electrode at each synthesis location. This allows a synthesis reaction to be enabled in each of a plurality of synthesis locations in parallel. Hence, the inventive device may support an overall greater degree of parallelism, compared to a serial/sequential activation of the electrodes. Considering that some synthesis reactions usable for data storage purposes may have a reaction time being on the order of seconds, it may be understood that a parallel approach may considerably improve the feasibility of molecular memories with millions or billions of memory cells.

A bit cell comprising a non-volatile memory transistor furthermore enables forming the bit cells with a cell size matching or being smaller than the size of synthesis locations of synthesis arrays (for instance on the order of one or a few hundred nanometers). In other words, the lower scaling limit of the bit cell size need not be a factor limiting the down-scaling of the synthesis locations of the synthesis array.

By a synthesis array comprising an array of synthesis locations is hereby meant an array of synthesis locations (e.g., synthesis spots), each location being adapted to allow a molecular synthesis at the location By non-volatile memory transistor is hereby meant a transistor with a programmable/controllable threshold voltage which may persist even after power cycling. Accordingly, a binary value of a bit may be stored in a non-volatile manner in the memory transistor by setting the threshold voltage to either a first threshold voltage and a second threshold voltage, the second threshold voltage being higher than the first threshold voltage. For conciseness, the first threshold voltage and the second threshold voltage may in the following be referred to as the low threshold voltage and the high threshold voltage, respectively.

The molecular synthesis device may comprise a controller configured to: receive a data set indicating electrodes of the synthesis array which are to be enabled, set the memory transistor of each bit cell of the array of bit cells connected to an electrode which is to be enabled (according to the data set) to the low threshold voltage and set the memory transistor of each other bit cell to the high threshold voltage, and applying a control voltage, intermediate the low and high threshold voltages, to the wordlines and an electrode voltage to the bit lines.

Accordingly, for each synthesis location in which the electrode is to be enabled, the memory transistor which is connected to the electrode may be set to the low threshold voltage. For each synthesis location in which the electrode is not to be enabled (e.g., not activated), the memory transistor which is connected to the electrode of may be set to the high threshold voltage.

In response to applying the control voltage to the wordlines, electrodes connected to memory transistors set to the low threshold voltage may be selectively connected to the bit line and thereby supplied with the electrode voltage. By electrode voltage is hereby meant a voltage for activating the electrode (and thereby enable or inhibit a chemical reaction in the respective synthesis location). Provided the control voltage is applied to each of the wordline of the non-volatile memory simultaneously, the electrodes may be activated simultaneously, at least substantially simultaneously.

The non-volatile memory may be configured such that bit cells arranged in a same array column are connected to a same bitline and such that bit cells of the array of the non-volatile memory arranged in a same array row are connected to a same wordline. The number of conductive lines may thus be limited.

The non-volatile memory may be a NOR flash memory. NOR flash memory is a mature non-volatile memory technology, enabling area efficient bit cells and parallel read-out.

The memory transistor of each bit cell may include either a floating gate or a charge trapping layer. A threshold voltage of a memory transistor including either a floating gate or a charge trapping layer may be programmed by controlling the amount of charge on the floating gate/charge trapping layer. Accordingly, the threshold voltage may be switched between (at least) a low threshold voltage and high threshold voltage, as earlier discussed. As the charges are trapped on the floating gate/charge trapping layer, non-volatile operation is allowed.

The memory transistor of each bit cell may be a ferroelectric transistor. A threshold voltage of a ferroelectric transistor may be programmed by setting the polarization of a ferroelectric layer of the transistor to either one of a first state with a first orientation of polarization or a second state with a second orientation of polarization, opposite the first orientation. Accordingly, the threshold voltage may be switched between (at least) a low threshold voltage and high threshold voltage, as earlier discussed. As the ferroelectric layer retains its polarization even in absence of an external field, non-volatile operation is allowed.

As a third aspect of the invention, there is provided a method of controlling the storing of information comprising the steps of receiving information on the type of homo-bifunctional monomers in a group of homo-bifunctional monomers: receive a sequence of bits; determine a sequence of the homo-bifunctional monomers representing the sequence of bits.

The method of the third aspect may be performed by a control unit, such as by a control unit in the synthesis system discussed in relation to the second aspect above.

The method may further comprise assigning at least one core structure of the different homo-bifunctional monomers to represent a first digit and at least one different core structure of the different homo-bifunctional monomers to represent a second digit in the sequence of bits to be stored.

The method thus allows for automatically translating a sequence of bits into a sequence of homo-bifunctional monomers representing the sequence of bits to be stored.

The method of the third aspect may further comprise initiating a synthesis reaction for synthesizing a polymer comprising the determined sequence of the homo-bifunctional monomers.

BRIEF DESCRIPTION OF THE DRAWINGS

The above, as well as additional objects, features and advantages of the disclosed technology, will be better understood through the following illustrative and non-limiting detailed description, with reference to the appended drawings. In the drawings like reference numerals will be used for like elements unless stated otherwise.

FIGS. 8a and 8b are schematic perspective views of designs of memory transistors according to embodiments.

FIGS. 9-10 illustrate programming of a non-volatile memory according to embodiments.

DETAILED DESCRIPTION OF CERTAIN ILLUSTRATIVE EMBODIMENTS

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

The data is not limited to any particular data, but may be any form of data in the form of bits such as data files and obtained from any suitable data source such as, for example, a computer or computer memory, a memory disk, an instrument providing data, and data storage. The data source may be connected or linked directly or indirectly to the system implementing the method, thereby allowing bits to be received by the method and written in the form of a polymer.

The storing of data into a polymer may proceed until deciding that the writing of data has come to an end, or until all data to be written has been written.

Figure 1:
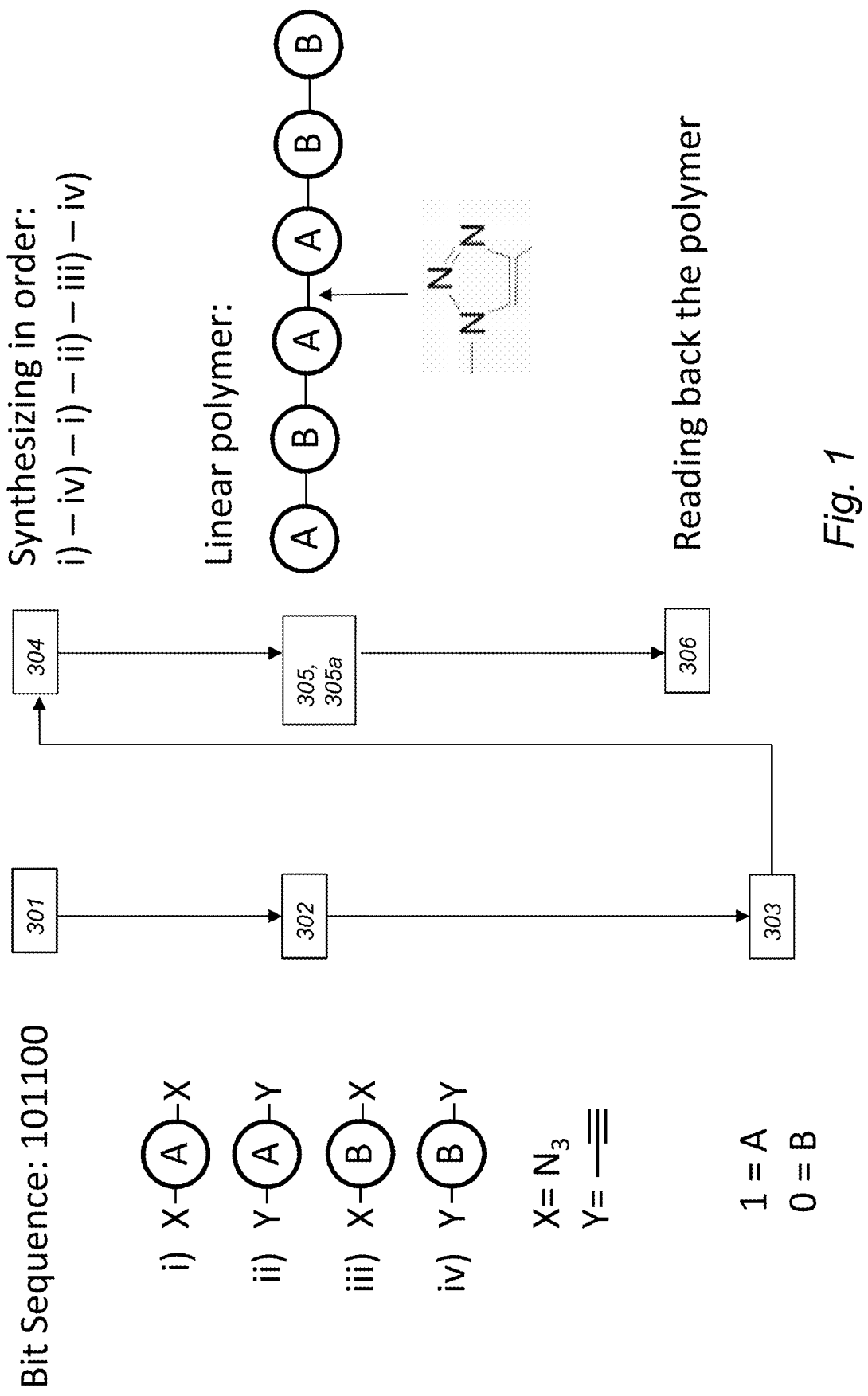
FIG. 1 is an illustration of an embodiment of a method of storing data in a linear polymer.

FIG. 1 shows a general process outline in which a bit sequence is coded into a linear polymer. The method comprises a first step of receiving 301 a bit sequence. The data is in this embodiment may be in the form of a binary sequence comprising digits 1 and 0. The method further comprises the step of providing 302 a group of homo-bifunctional monomers. By way of illustration, four different homo-bifunctional monomers are illustrated and denoted i), ii), iii), and iv).

The group of homo-bifunctional monomers comprises monomers having two different core structures, denoted A and B, and two different functional groups, denoted X and Y. The monomers are provided so that there are monomers having core structure A and functional groups X, core structure A and functional groups Y, core structure B and functional groups X and core structure B and functional groups Y. The core structures A and B differ in this embodiment that they comprise different organic molecules with different sterical size. For example, A may comprise a benzene moiety and B may lack a benzene moiety. In these embodiments, A may be more "bulky" than B. The functional group X is in this embodiment comprises an azide, whereas the functional group Y comprises an alkyne.

The method further comprises assigning 303 core structure A to represent 1 and core structure B to represent 0 in the sequence of bits to be stored. Thereafter, the method comprises determining 304 the order in which the monomers are to be linked based on the assignment, e.g., based on which digit has been allocated to which core structure of the group of homo-bifunctional monomers. In this illustrated case, the order is i)-iv) -i)-ii) -iii)-iv). Since the bit sequence comprises several digits of the same kind in a row, the group of homo-bifunctional monomers comprises monomers having the same core structure but with different functional groups. For example, there are monomers having core structure A functionalized with X, e.g., the azide, and monomers having core structure A functionalized with Y, e.g., the alkyne, in order to link two A with each other.

The method then comprises the step of linking 305 the homo-bifunctional monomers together in the sequence that was determined in step 304. In this embodiment, the monomers are linked to each other using the copper catalyzed azide-alkyne cycloaddition (CuAAC) click chemistry reaction, in which the monomers are coupled together in the well-defined order resulting in a triazole backbone linker in the formed linear polymer. The step of linking 305 further comprises a step of supplying 305a the different homo-bifunctional monomers in a sequence to a site of reaction, such as to a solution in which the polymer may be synthesized or to a solid support onto which the polymer may be synthesized. The polymer may thus be anchored to the solid support.

The method further comprises a step of reading back 306 the linear polymer to retrieve the information that has been stored. This step may comprise cleaving the polymer from a solid support onto which the polymer has been synthesized, transferring the polymer to a nanopore and monitoring the electrical output in the nanopore. For example, the core structure A comprising a benzene moiety is bulkier and may lead to more blockage or a different behaviour in the nanopore compared to core structure B, which may lack a benzene moiety. Thus, by reading the electrical output based on an applied voltage over the pore, the stored sequence may be read back.

Figure 2:
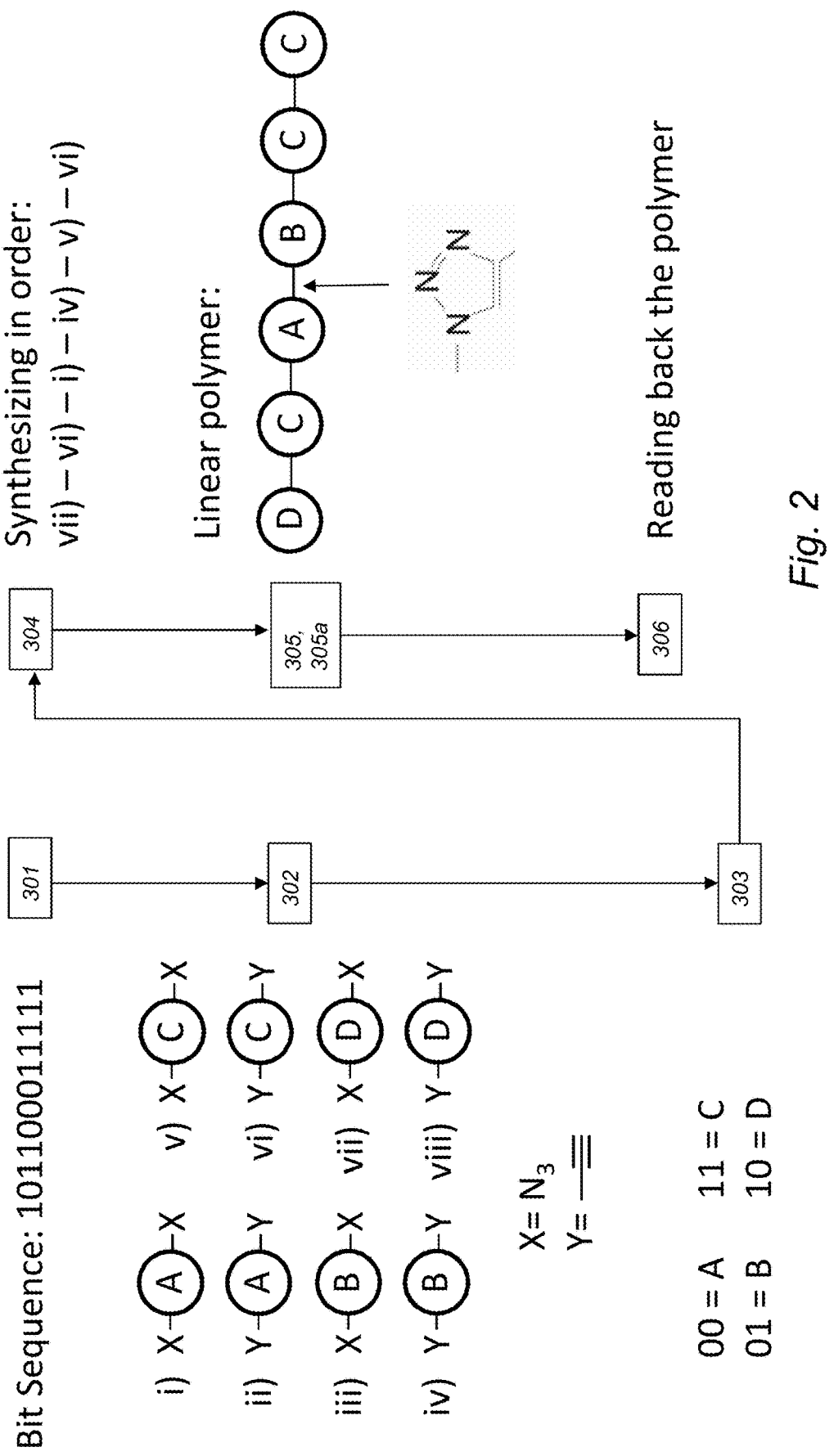
FIG. 2 is an illustration of an embodiment of a method of storing data in a linear polymer.

FIG. 2 shows another embodiment different from the embodiment of FIG. 1. The method works generally in similar ways as the method disclosed in relation to FIG. 1. However, in this embodiment, the group of homo-bifunctional monomers comprises monomers having four different core structures, A, B C and D, and all these core structures are combined with the functional groups X and Y to form eight different homo-bifunctional monomers in total, as seen in the step of providing 302 homo-bifunctional monomers. The step of assigning 303 comprises in this embodiment assigning a two-bit sequence with a specific core structure. For example, the four core structures A to D are each assigned to a different two-bit sequence, 00, 01, 11 or 11, respectively, as seen in FIG. 2. Thus, in this embodiment, a core structure represents two bits, and the bit to core structure ratio is in this case 2:1. After determining 304 the sequence of core structures based on the assignment and linking 305 the monomers according to the determined sequenced, a linear polymer is formed comprising core structures A, B, C and D linked together with the triazole backbone linker. Note that since the bit to core structure ratio was 2:1, the longer bit sequence stored in the example illustrated in FIG. 2 (12 bits) do not lead to a longer linear polymer compared to the example illustrated in FIG. 1, in which the bit sequence was shorter (6 bits) but the bit to core structure ratio was 1:1. Thus, the method makes it possible to use several different storing possibilities, and having a larger number of core structures allows for increasing the bit to core structure ratio, thereby shortening the formed polymer and compacting the stored data.

Figure 3:
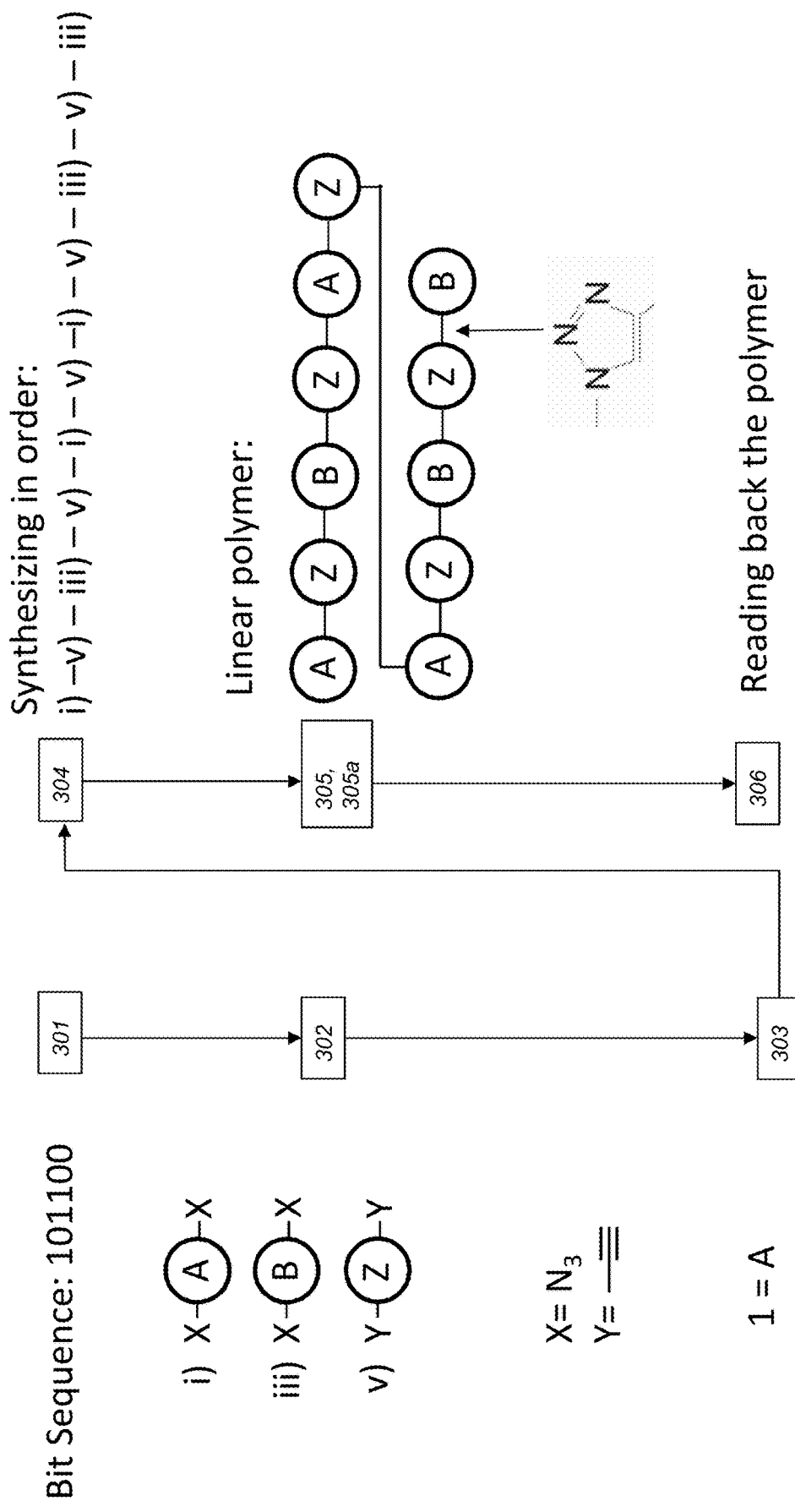
FIG. 3 is an illustration of an embodiment of a method of storing data in a linear polymer.

FIG. 3 shows an embodiment similar to that discussed in relation to FIG. 1, but in this case the homo-bifunctional monomers comprises three different types; X-A-X (i), X-B-X (iii) and Y-Z-Y (v). Core structures A and B represent bit 1 and 0, respectively, whereas the homo-bifunctional monomer having core structure Z is merely used for linking the "coding" core structures A and B together in a click chemistry reaction. As in the previous examples, functional group X is an azide and functional group Y is an alkyne. Thus, the two core structures representing different digits in the bit sequence, A and B, are functionalized with the same functional group X and in order to link the core structures together the spacer monomer Y-Z-Y is used. Compared to the embodiments shown discussed above in relation to FIGS. 1 and 2, this results in a longer polymer for storing the bit sequence, as seen in the formed linear polymer at step 305 in FIG. 3.

Figure 4D:
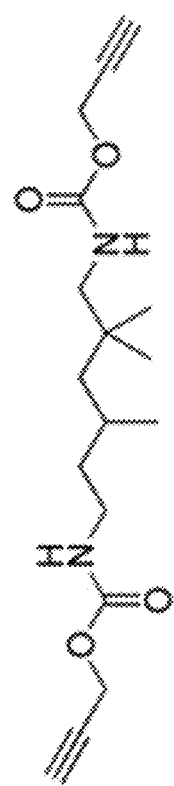
FIGS. 4a-4e are illustrations of homo-bifunctional monomers that may be used in the methods according to embodiments.
Figure 4E:
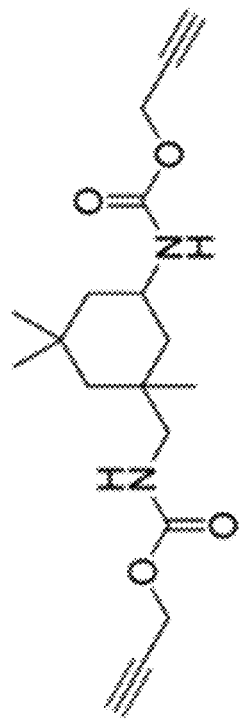
Figure 4A:
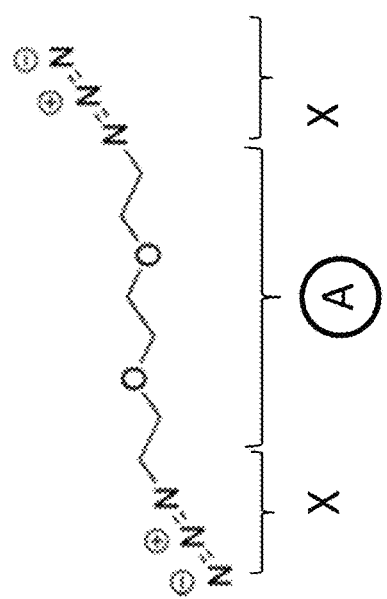
Figure 4B:
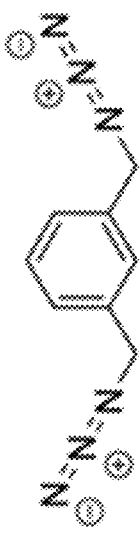
Figure 4C:
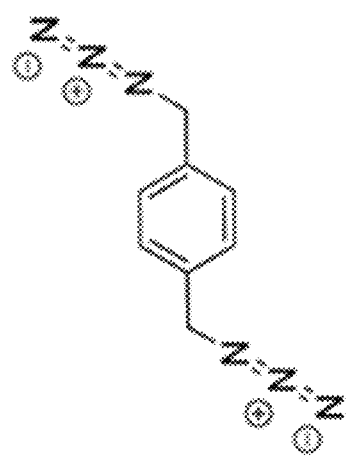

FIGS. 4a to 4e show examples of different homo-bifunctional monomers that can be used when the click chemistry reaction is the copper catalyzed azide-alkyne cycloaddition (CuAAC). A seen in FIG. 4a, the homo-bifunctional monomer comprises a linear core structure, denoted A, and two identical functional groups in the form of azide moieties, denoted X, at each end. FIG. 4b and FIG. 4c show other types of core structures linked to azide moieties, whereas FIGS. 4d and 4e shows two different core structures having alkyne ends as functional groups.

Figure 5:
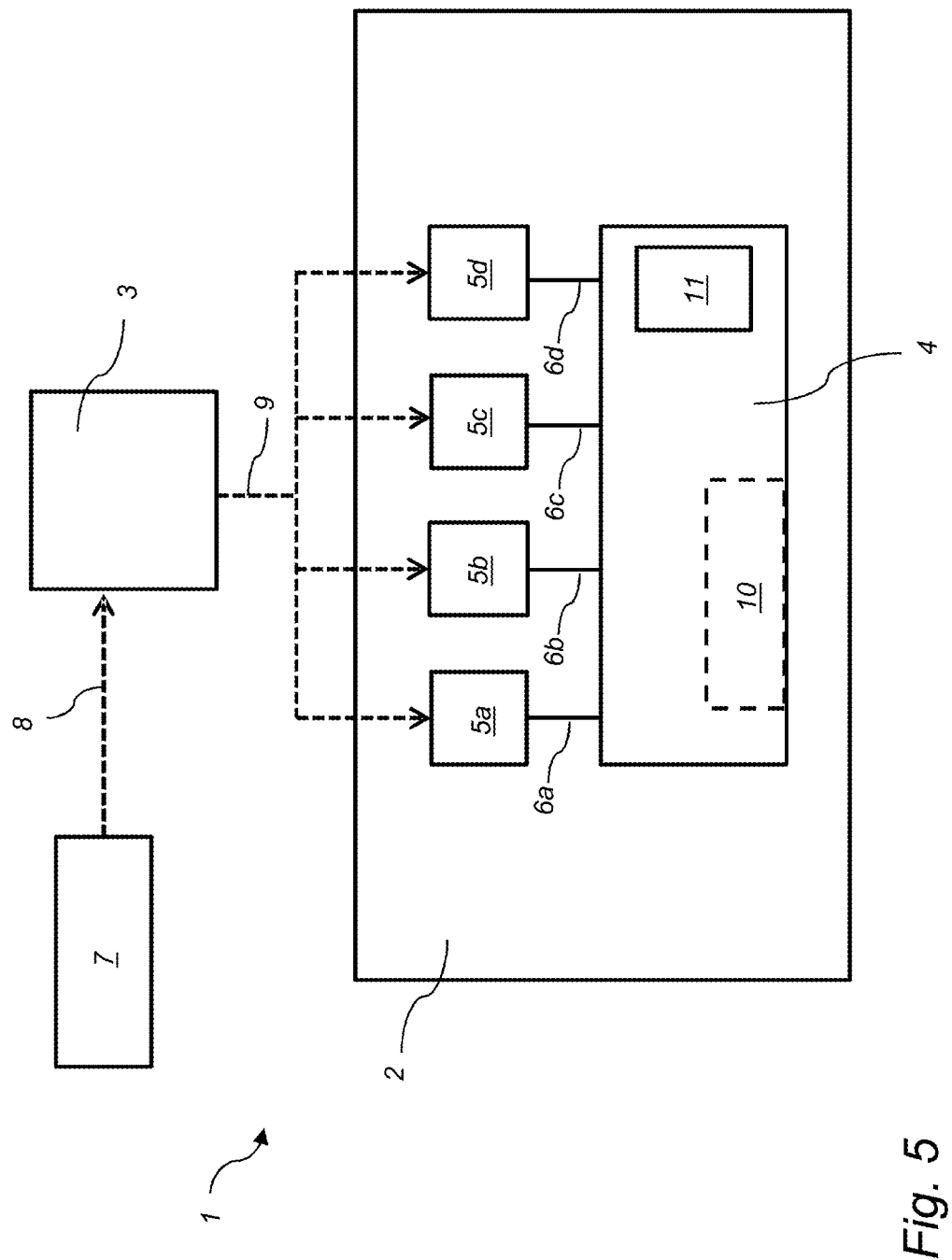
FIG. 5 is an illustration of a synthesis system according to an embodiment.

FIG. 5 shows a synthesis system 1 that may be used for performing the method of the present disclosure. The microfluidic system comprises a microfluidic chip 2 and a control unit 3. The microfluidic chip 2 comprises a polymer synthesis chamber 4, which may be for example a well, a compartment, or other suitable type of container, configured to comprise a polymer in liquid. The system 1 further comprises microfluidic channels 6a-6d fluidically connected to the polymer synthesis chamber 4 and configured to forward liquids to the polymer synthesis chamber 4. There are also four different compartments 5a-5d, each fluidically connected to the polymer synthesis chamber 4 via one of the microfluidic channels 6a-6d, and each configured to comprise a solution of homo-bifunctional monomers.

The microfluidic channels 6a-6d b may each be directly connected to the compartment 4, as shown in FIG. 5, or may be indirectly connected via an additional channel (not shown). The compartments 5a-5d configured for comprising solution of homo-bifunctional monomers may alternatively be arranged outside of the chip as separate compartments. In this embodiment, each compartment is connected to the synthesis chamber 4 via an individual fluid channel, so that compartment 5a is connected to the chamber 4 via channel 6a, compartment 5b is connected to the chamber 4 via channel 5a, and so on. In this embodiment, there are four compartments 5a-5d, each comprising different homo-bifunctional monomers from the group consisting of homo-bifunctional monomers that are represented by the formulas i) X-A-X, ii) Y-A-Y, iii) X-B-X and iv) Y-B-Y, as discussed in relation to the example illustrated in FIG. 1 above.

The control unit 3 is configured to receive information on the type of homo-bifunctional monomers in each compartment. This may have been received before receiving the data to be stored. For example, the information may be pre-programmed into the control unit 3.

The control unit is further arranged for receiving of data, such as by, for example, being connected to a data storing or producing unit 7. The control unit is thus configured to receive a sequence of bits from the data storing unit 7, as indicated by arrow 8 in FIG. 5.

The control unit is further configured to determine a sequence of homo-bifunctional monomers representing the sequence of bits that has been received. This may be based on information on which bit or sequence of bits that are assigned to the specific core structure of the homo-bifunctional polymers present in the chambers 5a and 5b.

The control unit 3 may comprise a processor and an input/output interface for communicating with the data storing unit 7 and regulating devices (not shown) for controlling the flow from the compartments 5a-5d to the synthesis chamber 4. The regulating devices may be in the form of one or several flow generators, such as a pump, arranged to pump the solution of monomers. Thus, the processor may be adapted to access data from the storing device and generate and transmit control signals to the regulating devices, thereby initiating flow or stopping flow of monomers from each of the compartments 5a-5d to the synthesis chamber 4. Thus, the control unit is configured to forward solutions from the at least four different compartments in a sequence corresponding to the determined sequence of homo-bifunctional monomers to the polymer synthesis chamber, thereby initiating synthesis of a polymer in the polymer synthesis chamber having a sequence of monomers representing the sequence of bits.

The control unit may be configured to repeatedly perform the steps discussed above.

There is also an electrode 11 connected to the synthesis chamber 4. The electrode 11 may comprise an anode and a cathode and may be arranged so that the anode is in electrical contact with a surface of the synthesis chamber 4. The electrode may thus be used for inducing transformation of Cu(I) to Cu(II) and vice versa and thus be used for controlling a copper catalyzed azide-alkyne cycloaddition (CuAAC) in the chamber 4 for synthesising the polymer. The polymer may be attached to the surface of the chamber during synthesis.

The microfluidic chip 2 may further comprise, or be arranged to be connected to, compartments arranged for comprising buffers, electrolytes or ion-solutions, fluidically connected to the polymer synthesis chamber via microfluidic channels.

The microfluidic chip 2 may further comprise an array of synthesis chambers 4, and each of those chambers may be connected to electrodes 11.

As an alternative to a single electrode 11, an array of electrodes may be used for inducing synthesis in the polymer synthesis chamber 4. The array of electrodes may thus form or give rise to an array of synthesis locations within or in fluid contact with the synthesis chamber 4. The array of electrodes may be provided in or form part of a molecular synthesis device 10, indicated in dashed lines at the synthesis chamber in FIG. 5. An example of a molecular synthesis device 10 is described in relation to FIGS. 6-10 below.

Figure 6:
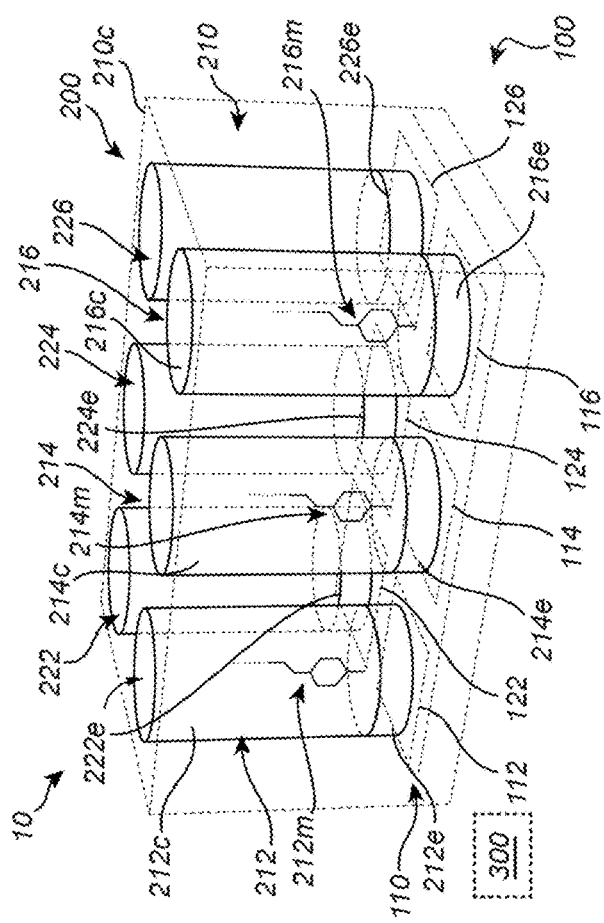
FIG. 6 is a schematic perspective view of a molecular synthesis device according to embodiments.

FIG. 6 schematically illustrates a molecular synthesis device 10 comprising a non-volatile memory 100 and a synthesis array 200.

The non-volatile memory (NVM) 100 comprises an array 110 of bit cells 112, 114, 116, 122, 124, 126. The synthesis array 200 comprises an array of synthesis locations 212, 214, 216, 222, 224, 226 (commonly referenced 210). In FIG. 6 only six bit cells and synthesis locations are visible, however this would typically represent only a small part of the device 10 comprising bit cell arrays and synthesis arrays of much greater sizes.

The molecular synthesis device 10 may thus be arranged in a synthesis system 1 such that the array of synthesis locations 212, 214, 216, 222, 224, 226 are arranged within the polymer synthesis chamber 4.

Figure 7:
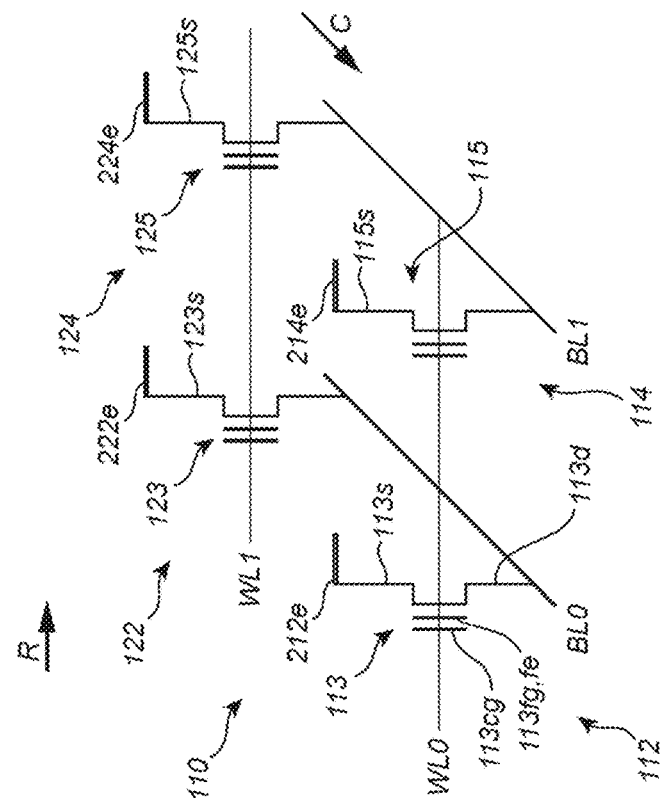
FIG. 7 is a schematic circuit layout of bit cells of a non-volatile memory according to embodiments.

FIG. 7 shows a circuit layout of a portion of the array 110 including bit cells 112, 114, 122, 124. The NVM 100 is configured as a NOR flash memory. Each bit cell of the array 110 comprises a respective non-volatile memory transistor 113. Reference is in the following made to the memory transistor 113 of the bit cell 112 but the further bit cells of the array 110 comprises a corresponding memory transistor 115, 123, 125. The memory transistor 113 has a control gate 113$cg$, a first source/drain terminal 113$s$ (hereinafter referred to as the first terminal 113$s$) and a second source/drain terminal 113$d$ (hereinafter referred to as the second terminal 113$d$). The control gate 113$cg$ is connected to a wordline WL0. The second terminal 113$d$ is connected to a bit line BL0. The first terminal 113$s$ is connected to an electrode 212$e$ arranged at the synthesis location 212. Correspondingly, the terminal 115$s$ of the memory transistor 115 is connected to an electrode 214$e$ arranged at the synthesis location 214. The terminal 123$s$ of the memory transistor 123 is connected to an electrode 222$e$ arranged at the synthesis location 222. The terminal 125$s$ of the memory transistor 125 is connected to an electrode 224$e$ arranged at the synthesis location 224.

The memory transistor 113 may be a field-effect transistor (FET). The memory transistor 113 may as shown in FIG. 7 be a floating gate FET comprising a floating gate 113$fg$ arranged between the control gate 113$cg$ and the channel. The floating gate 113$fg$ may for instance be of a polysilicon or metal material. The memory transistor 113 may alternatively include an oxide- or dielectric-based charge trapping layer arranged between the control gate 113$cg$ and the channel. The charge trapping layer may for instance be an oxide-nitride-oxide layer, a silicon dioxide layer, a silicon nitride layer, or other defect rich dielectric. Single-layered charge trapping layers as well as composite-layered charge trapping layers are possible. As both of these memory transistor types are based on charge trapping the bit cell comprising any of these transistor types may be referred to as a charge trap bit cell.

Alternatively, the memory transistor 113 may instead be a ferroelectric FET comprising a ferroelectric layer 113$fe$ arranged between the control gate 113$cg$ and the channel. Any typical ferroelectric material suitable for a ferroelectric FET may be used. The ferroelectric layer may for instance be a layer of hafnium oxide ($HfO_2$), $(Pb,Zr)TiO_3$ or $SrBi_2Ta_2O_9$.

The NVM 100 comprises a set of wordlines WL0, WL1 and a set of bitlines BL0, BL1. The wordlines may extend along a row direction R of the array 110. The bitlines may extend along a column direction C of the array 110, perpendicular to the row direction R.

As shown in FIG. 7, bit cells of the array 110 of the NVM 100 arranged in a same array column are connected to a same bitline. That is, the bit cells 112, 122 are connected to the bitline BL0. The bit cells 114, 124 are connected to the bitline BL1. Meanwhile, bit cells of the array 110 of the NVM 100 arranged in a same array row are connected to a same wordline. That is, the bit cells 112, 114 are connected to the wordline WL0. The bit cells 122, 124 are connected to the wordline WL1.

For the purpose of providing voltages and currents to wordlines and bitlines, the NVM 100 may further comprise driver circuitry including wordline drivers and bitline drivers. The function and implementation of such driver circuitry is per se known to the skilled person and will therefore not be further described herein. The device 10 may comprise a controller 300, schematically indicated in FIG. 6. The controller 300 may be configured to control the NVM 100, such as the driver circuitry. The controller 300 may form part of the NVM 100. The controller 300 may be realized by active devices formed on a same semiconductor substrate as the NVM 100.

With reference to FIG. 8a, the memory transistors 113, 115, 123, 125 of the NVM array 110 may be realized as vertical channel transistor devices, each comprising a vertical channel 113$c$, 115$c$, 123$c$, 125$c$ formed in a semiconductor structure protruding vertically from an underlying semiconductor substrate. A respective via 113$v$, 115$v$, 123$v$, 125$v$ may be formed on top of each memory transistor 113, 115, 123, 125 for connecting each memory transistor with the respective electrode 212$e$, 214$e$, 216$e$, 222$e$, 224$e$, 226$e$ of the synthesis array 200.

FIG. 8$b$ shows an alternative design wherein each memory transistor 113, 115, 123, 125 comprises a horizontal channel 113c, 115c, 123c, 125c formed in a horizontally extending portion of a semiconductor substrate 101. Memory transistors formed as FinFETs or horizontal nanowire FETs are however also possible.

In embodiments, the synthesis system 1 comprises a plurality of polymer synthesis chambers 4, and the array of electrodes may be arranged so that a respective electrode is arranged at a synthesis chamber 4, such as at each synthesis chamber 4

Regardless of whether a common synthesis chamber or individual synthesis chambers, are provided, a respective electrode 212e, 214e, 216e, 222e, 224e, 226e may be arranged at each synthesis location 212, 214, 216, 222, 224, 226 of the array 210, in contact with the (respective) synthesis compartment(s) or synthesis chambers 4.

Each electrode 212e, 214e, 216e, 222e, 224e, 226e may accordingly contact the molecular synthesis medium 212m, 214m, 216m, 222m, 224m, 226m of the respective synthesis locations 212, 214, 216, 222, 224, 226. Each electrode may thereby influence the chemical environment in the molecular synthesis medium of the associated synthesis location. The electrodes 212e, 214e, 216e, 222e, 224e, 226e may be formed of a conventional electrode material such as Al, Au, Ag, or Cu.

The synthesis array 210 may in addition to the indicated (first) electrodes 212e, 214e, 216e, 222e, 224e, 226e comprise a second electrode arranged at each synthesis location 212, 214, 216, 222, 224, 226. The second electrode may be common to all synthesis locations 212, 214, 216, 222, 224, 226 or an individual second electrode may be provided for each synthesis locations 212, 214, 216, 222, 224, 226. The (first) electrodes 212e, 214e, 216e, 222e, 224e, 226e and the second electrode(s) may be arranged on opposite sides of the molecular synthesis mediums 212m, 214m, 216m, 222m, 224m, 226c or synthesis compartment(s) 210c or 212c, 214c, 216c, 222c, 224c, 226c. The (first) electrodes 212e, 214e, 216e, 222e, 224e, 226e and the second electrode(s) may be configured as respective anode-cathode pairs.

The synthesis compartments 210c or 212c, 214c, 216c, 222c, 224c, 226c may thus correspond to individual polymer synthesis chamber 4 of the synthesis system 1.

Methods for selectively activating electrodes of the synthesis array 200 by programming the NOR-flash NVM 100 will now be described with reference to FIGS. 9 and 10. FIGS. 9 and 10 are schematic views of the array 110 of the NVM 100 wherein horizontal lines indicate wordlines, vertical lines indicate bitlines and circles indicate bit cells of the array 110.

In a first step shown in FIG. 9 the entire array 110 is erased by performing a Fowler-Nordheim tunneling erase of each bit cell. Thereby the memory transistor of each bit cell is set to the low threshold voltage, as indicated by the non-filled circles in the figure. The entire array 110 may be erased simultaneously or in a block-wise manner. For instance, an wordline erase control voltage Verase on the order of –10 V to –14 V may be applied to the wordlines while a bitline erase control voltage of about 0 V (e.g., about ground) may be applied to the bitlines. The voltages may be applied as pulses, for instance with a duration on the order of 1-10 milliseconds.

In a second step the memory transistor of each bit cell connected to an electrode of the synthesis array 200 which is not to be activated is set to the high threshold voltage. Thereby the memory transistor of selected bit cell is set to the high threshold voltage, as indicated by the filled circles in FIG. 10. The programming of these bit cells to the high threshold voltage may be performed sequentially, along one wordline at a time.

FIG. 10 illustrates programming bit cells using Fowler-Nordheim tunneling. A wordline programming voltage Vprog on the order of 10 to 14 V may be applied to the wordline connected to bit cells which are to be programmed while a bit line programming voltage of about 0 V may be applied to the associated bitlines. Programming of bit cells which are to remain in the low threshold voltage state may be inhibited by applying a bitline inhibit control voltage Vinhibit to the associated bitlines. The Vinhibit voltage may be a voltage intermediate Vprog and 0 V, for instance a voltage of 6 V may be sufficient for inhibiting Fowler-Nordheim tunneling in a bit cell. The programming and inhibit voltages may be applied as pulses, for instance with a duration on the order of 10-100 microseconds.

In use of the device 10, the controller 300 may receive a data set indicating bit cells of the NVM array 110 which are to be set to a high and low threshold voltage state, respectively, the data set thus indicating the electrodes of the synthesis array 200 which are to be enabled. In response, the controller 300 may program the array 110 by erasing the array 110 and thereafter selectively programming bit cells by Fowler-Nordheim tunneling or channel hot electron injection, as described above.

Subsequent to programming, the electrodes may be selectively activated by applying a read control voltage, intermediate the low and high threshold voltages, to the wordlines and an electrode voltage to the bit lines. By way of example, a read control voltage in the range of 1-3 V may be applied, selected by taking the low and high threshold voltages into account. The magnitude of the electrode voltage may depend on the particular synthesis reaction that is to be controlled. The electrode voltage may as a non-limiting example be in the range of 1-5 V.

As will be appreciated by the person skilled in the art the magnitudes of the voltages and the pulse durations mentioned above merely represent non-limiting examples and the actual magnitudes will depend on the electrical properties of the memory transistors of the bit cells. Moreover, although the programming is described in connection with charge trap bit cells, bit cells including memory transistors in the form of ferroelectric FETs may be programmed in a corresponding manner by application of appropriate voltages to the wordlines and bitlines for switching the polarizations of ferroelectric FETs, as per se is known in the art.

The synthesis system 1 may be for performing the method according to the first aspect.

In the above the inventive concept has mainly been described with reference to a limited number of examples. However, as is readily appreciated by a person skilled in the art, other examples than the ones disclosed above are equally possible within the scope of the inventive concept, as defined by the appended claims.

What is claimed is:

1. A method of synthesizing a polymer, the method comprising:
   providing a microfluidic chip comprising a polymer synthesis chamber fluidically connected to a plurality of compartments,
     wherein the microfluidic chip is electrically connected to a processor configured to control a sequence in which different homo-bifunctional monomers are introduced according to a predetermined sequence of monomer core structures, the method further comprising:

providing a group of different homo-bifunctional monomers,
    wherein each of the different homo-bifunctional monomers comprises a core structure having identical functional groups attached at two different positions of the core structure, different ones of the homo-bifunctional monomers provided in different ones of the compartments, and
    wherein the group of different homo-bifunctional monomers comprises homo-bifunctional monomers having at least two different core structures;
receiving, by the processor, a sequence of bits for data storage;
processing, by the processor, the sequence of bits for data storage to generate a first control signal for a first digit or sub-sequence of digits in the sequence of bits for data storage, and generate a second control signal for a different digit or sub-sequence of digits in the sequence of bits for data storage;
initiating, via the first control signal, a flow of microfluids containing at least one core structure of the homo-bifunctional monomers into the polymer synthesis chamber; and
initiating, via the second control signal, a flow of microfluids containing at least one different core structure of the different homo-bifunctional monomers;
linking the different homo-bifunctional monomers together, in the polymer synthesis chamber, to synthesize the polymer having a predetermined sequence of monomer core structures corresponding to the sequence of bits for data storage,
    wherein the different homo-bifunctional monomers are linked together using a click chemistry reaction between the functional groups of the different homo-bifunctional monomers, and
    wherein the click chemistry reaction comprises at least one of a thiol-ene reaction, a Diels-Alder reaction, an imine condensation, a hydrazone condensation, an oxime carbonyl condensation and a copper catalyzed azide-alkyne cycloaddition.

2. The method according to claim 1, further comprising receiving, by the processor, a second sequence of bits for data storage;
    compressing, by the processor, the second sequence of bits for data storage to generate the sequence of bits for data storage, wherein a sub-sequence of at least two digits in the second sequence of bits for data storage generates a single digit in the sequence of bits for data storage.

3. The method according to claim 1, wherein linking the different homo-bifunctional monomers together comprises supplying the different homo-bifunctional monomers in the predetermined sequence to a site of reaction in the polymer synthesis chamber.

4. The method according to claim 1,
    wherein the group of different homo-bifunctional monomers comprises four different homo-bifunctional monomers represented by the following formulas:
    i) X-A-X;
    ii) Y-A-Y;
    iii) X-B-X; and
    iv) Y-B-Y;
    wherein A and B are different core structures and Y and X are two different functional groups adapted to link the different homo-bifunctional monomers in the click chemistry reaction between the functional group X and the functional group Y.

5. The method according to claim 1, wherein the click chemistry reaction is a copper catalyzed azide-alkyne cycloaddition (CuAAC) and the polymer comprises a triazole backbone linker between at least some of the core structures of the monomers.

6. The method according to claim 4, wherein X is an alkyne moiety and Y is an azide moiety.

7. The method according to claim 1, wherein the different homo-bifunctional monomers differ by having core structures comprising groups of different sterical size.

8. The method according to claim 1, wherein linking the different homo-bifunctional monomers is performed at a solid support such that the polymer is attached to the solid support.

9. The method according to claim 1, further comprising detecting an electrical output from a monomer core structure in the synthesized polymer, the electrical output relating back to the type of monomer to differentiate between different monomers, wherein the sequence of bits for data storage are determined from the electrical output.

10. A method of synthesizing a polymer, the method comprising:
    providing a microfluidic chip comprising a polymer synthesis chamber fluidically connected to a plurality of compartments,
    providing a group of different homo-bifunctional monomers,
        wherein each of the different homo-bifunctional monomers comprises a core structure having identical functional groups attached at two different positions of the core structure, different ones of the homo-bifunctional monomers provided in different ones of the compartments, and
        wherein the group of different homo-bifunctional monomers comprises homo-bifunctional monomers having at least two different core structures;
    receiving, by a processor, a sequence of bits for data storage;
    processing, by the processor, the sequence of bits for data storage to generate a first control signal for a first digit or sub-sequence of digits in the sequence of bits for data storage, and generate a second control signal for a different digit or sub-sequence of digits in the sequence of bits for data storage;
    initiating, via the first control signal, a flow of microfluids containing at least one core structure of the homo-bifunctional monomers into the polymer synthesis chamber; and
    initiating, via the second control signal, a flow of microfluids containing at least one different core structure of the different homo-bifunctional monomers;
    linking the different homo-bifunctional monomers together, in the polymer synthesis chamber, to synthesize the polymer having a predetermined sequence of monomer core structures corresponding to the sequence of bits for data storage,
        wherein the different homo-bifunctional monomers are linked together using a click chemistry reaction between the functional groups of the different homo-bifunctional monomers, and
        wherein the click chemistry reaction comprises at least one of a thiol-ene reaction, a Diels-Alder reaction, an imine condensation, a hydrazone condensation, an oxime carbonyl condensation and a copper catalyzed azide-alkyne cycloaddition,
    further comprising detecting an electrical output from a monomer core structure in the synthesized polymer, the electrical output generated by different core structures in a nanopore, the electrical output relating back to the type of monomer to differentiate between different monomers, wherein the sequence of bits for data storage are determined from the electrical output.

11. A synthesis system comprising:
a microfluidic chip comprising:
   a polymer synthesis chamber configured to contain a polymer in a liquid or a polymer attached to an inner surface of the chamber,
   microfluidic channels fluidically connected to the polymer synthesis chamber and configured to forward liquids to the polymer synthesis chamber to perform a click chemistry reaction, and
   at least four different compartments, each fluidically connected to the polymer synthesis chamber via one of the microfluidic channels, and each configured to comprise a solution of different homo-bifunctional monomers,
   wherein each of the different homo-bifunctional monomers comprises a core structure having identical functional groups attached at two different positions of the core structure, different ones of the homo-bifunctional monomers provided in different ones of the compartments, and
   wherein the group of different homo-bifunctional monomers comprises homo-bifunctional monomers having at least two different core structures;
a control unit comprising a processor configured to:
   receive, by the processor, a sequence of bits for data storage;
   receive, by the processor, information on the type of homo-bifunctional monomers in each compartment, and
   forward solutions from the at least four different compartments in a sequence corresponding to a predetermined sequence of homo-bifunctional monomers to the polymer synthesis chamber, thereby initiating synthesis of a polymer in the polymer synthesis chamber having the predetermined sequence corresponding to the sequence of bits for data storage,
   wherein the click chemistry reaction comprises at least one of a thiol-ene reaction, a Diels-Alder reaction, an imine condensation, a hydrazone condensation, an oxime carbonyl condensation and a copper catalyzed azide-alkyne cycloaddition.

12. The synthesis system according to claim 11, wherein the polymer synthesis chamber is arranged to be in contact with an electrode for electrically inducing a chemical reaction in the polymer synthesis chamber.

13. A method of synthesizing a polymer, the method comprising:
   providing a base polymer;
   providing a group of different homo-bifunctional monomers;
   providing a sequence of bits for data storage;
   reacting a first homo-bifunctional monomer to extend the base polymer by one monomer at one or more distal ends of the base polymer to synthesize an extended polymer; and
   reacting a second homo-bifunctional monomer to extend the extended polymer by one monomer at one or more distal ends of the extended polymer,
   wherein the first homo-bifunctional monomer comprises a first core structure having a first functional group attached at two different positions of the first core structure;
   wherein the second homo-bifunctional monomer comprises a second core structure different than the first core structure, the second core structure having a second functional group attached at two different positions of the second core structure;
   wherein the first and second homo-bifunctional monomers are linked according to a predetermined sequence of monomer core structures,
   wherein the predetermined sequence of monomer core structures corresponds to the sequence of bits for data storage,
   wherein the first and second homo-bifunctional monomers are linked together using a click chemistry reaction between the second functional group and a functional group on one or more distal ends of the extended polymer; and
   wherein the functional group on the one of the distal end of the extended polymer is different from the second functional group;
   wherein the click chemistry reaction comprises at least one of a thiol-ene reaction, a Diels-Alder reaction, an imine condensation, a hydrazone condensation, an oxime carbonyl condensation and a copper catalyzed azide-alkyne cycloaddition.

14. The method of claim 13, wherein the first homo-bifunctional monomer is a nucleoside having identical functional groups attached at two different positions of the nucleoside.

15. The method of claim 13, wherein the group of different homo-bifunctional monomers comprises four different homo-bifunctional monomers that are represented by the following formulas:
   i) X-A-X;
   ii) Y-A-Y;
   iii) X-B-X; and
   iv) Y-B-Y;
      wherein A and B are different core structures and Y and X are two different functional groups adapted to link the different monomers in the click chemistry reaction between the functional group X and the functional group Y.

16. The method of claim 13, wherein the group of different homo-bifunctional monomers comprises eight different homo-bifunctional monomers that are represented by the following formulas:
   i) X-A-X;
   ii) Y-A-Y;
   iii) X-B-X;
   iv) Y-B-Y;
   v) X-C-X;
   vi) Y-C-Y;
   vii) X-D-X;
   viii) Y-D-Y;
      wherein A, B, C, and D are different core structures and Y and X are two different functional groups adapted to link the different monomers in the click chemistry reaction between the functional group X and the functional group Y.

17. The method of claim 13, further comprising encoding a sequence of bits within the polymer by controlling the predetermined order of homo-bifunctional monomers during synthesis, wherein the physical arrangement of monomers produces a structured electrical signal pattern when measured using a nanopore-based detection system, the structured electrical signal pattern providing a readout mechanism for reconstructing the sequence of bits for data storage.

* * * * *